(12) United States Patent
Chokki

(10) Patent No.: US 11,195,547 B2
(45) Date of Patent: Dec. 7, 2021

(54) MAGNETIC DISK DEVICE AND DATA PROTECTION METHOD THEREOF

(71) Applicants: Kabushiki Kaisha Toshiba, Tokyo (JP); Toshiba Electronic Devices & Storage Corporation, Tokyo (JP)

(72) Inventor: Kazuo Chokki, Fujisawa Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/808,432

(22) Filed: Mar. 4, 2020

(65) Prior Publication Data

US 2021/0065737 A1    Mar. 4, 2021

(30) Foreign Application Priority Data

Aug. 28, 2019    (JP) .............................. JP2019-155796

(51) Int. Cl.
| | |
|---|---|
| *G11B 5/012* | (2006.01) |
| *G11B 5/55* | (2006.01) |
| *G11B 25/04* | (2006.01) |
| *G11B 19/20* | (2006.01) |

(52) U.S. Cl.
CPC .............. *G11B 5/012* (2013.01); *G11B 5/553* (2013.01); *G11B 19/2081* (2013.01); *G11B 25/043* (2013.01); *G11B 2220/2508* (2013.01)

(58) Field of Classification Search
None
See application file for complete search history.

(56) References Cited

U.S. PATENT DOCUMENTS

| | | | |
|---|---|---|---|
| 5,805,386 A | 9/1998 | Faris | |
| 5,835,464 A * | 11/1998 | Inagawa | G11B 19/04 369/47.33 |
| 6,512,650 B1 * | 1/2003 | Tanner | G11B 5/54 360/69 |
| 6,819,513 B2 | 11/2004 | Chainer et al. | |
| 6,859,340 B2 * | 2/2005 | Brittner | G11B 21/12 360/75 |
| 7,382,563 B2 * | 6/2008 | Saitoh | G11B 5/5582 360/60 |
| 8,693,130 B2 * | 4/2014 | Chokki | G11B 5/596 360/75 |
| 10,014,018 B1 | 7/2018 | Kiyonaga et al. | |
| 10,152,994 B1 | 12/2018 | Capretta et al. | |

(Continued)

*Primary Examiner* — Tan X Dinh
(74) *Attorney, Agent, or Firm* — Allen & Overy LLP

(57) ABSTRACT

According to one embodiment, a monitoring unit of a magnetic disk device monitors a supply voltage supplied to a plurality of actuators by a first threshold value at which power supply by back electromotive force of a motor is started, and a second threshold value that is larger than the first threshold value. In a case where the supply voltage is lower than or equal to the second threshold value and is higher than the first threshold value, a controller interrupts execution of processing of reading/writing data to a magnetic disk in at least one of the actuators according to a predetermined condition based on execution status of the processing in the actuators.

13 Claims, 7 Drawing Sheets

(56) References Cited

U.S. PATENT DOCUMENTS

| | | | | |
|---|---|---|---|---|
| 10,714,133 B1* | 7/2020 | Johnson | ............... | G11B 5/5547 |
| 2002/0079856 A1* | 6/2002 | Hill | ....................... | G11B 19/20 |
| | | | | 318/560 |
| 2004/0264036 A1* | 12/2004 | Ding | ................... | G11B 5/5582 |
| | | | | 360/78.08 |
| 2010/0328804 A1* | 12/2010 | Yamashita | ......... | G11B 5/59616 |
| | | | | 360/51 |

* cited by examiner

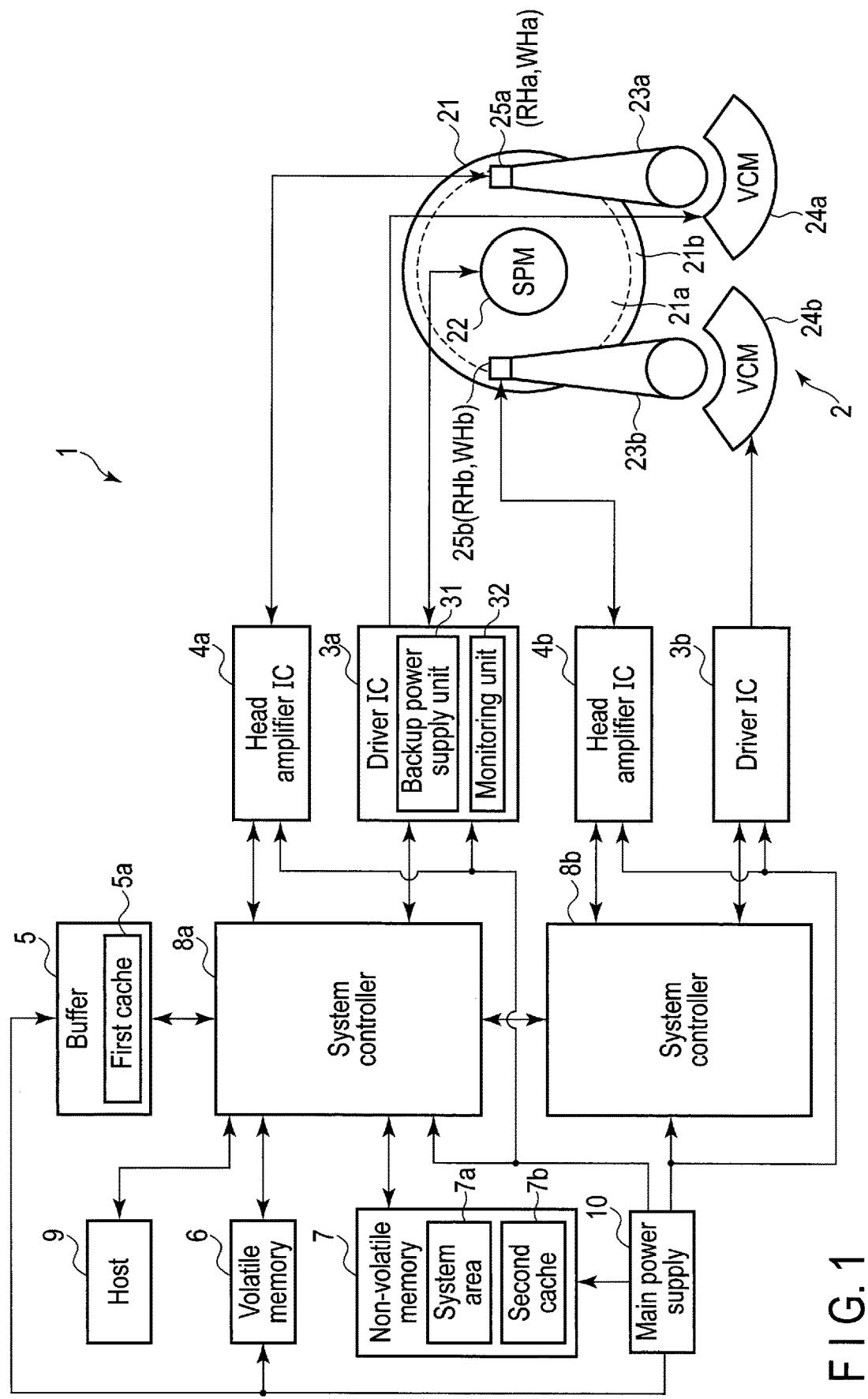
F I G. 1

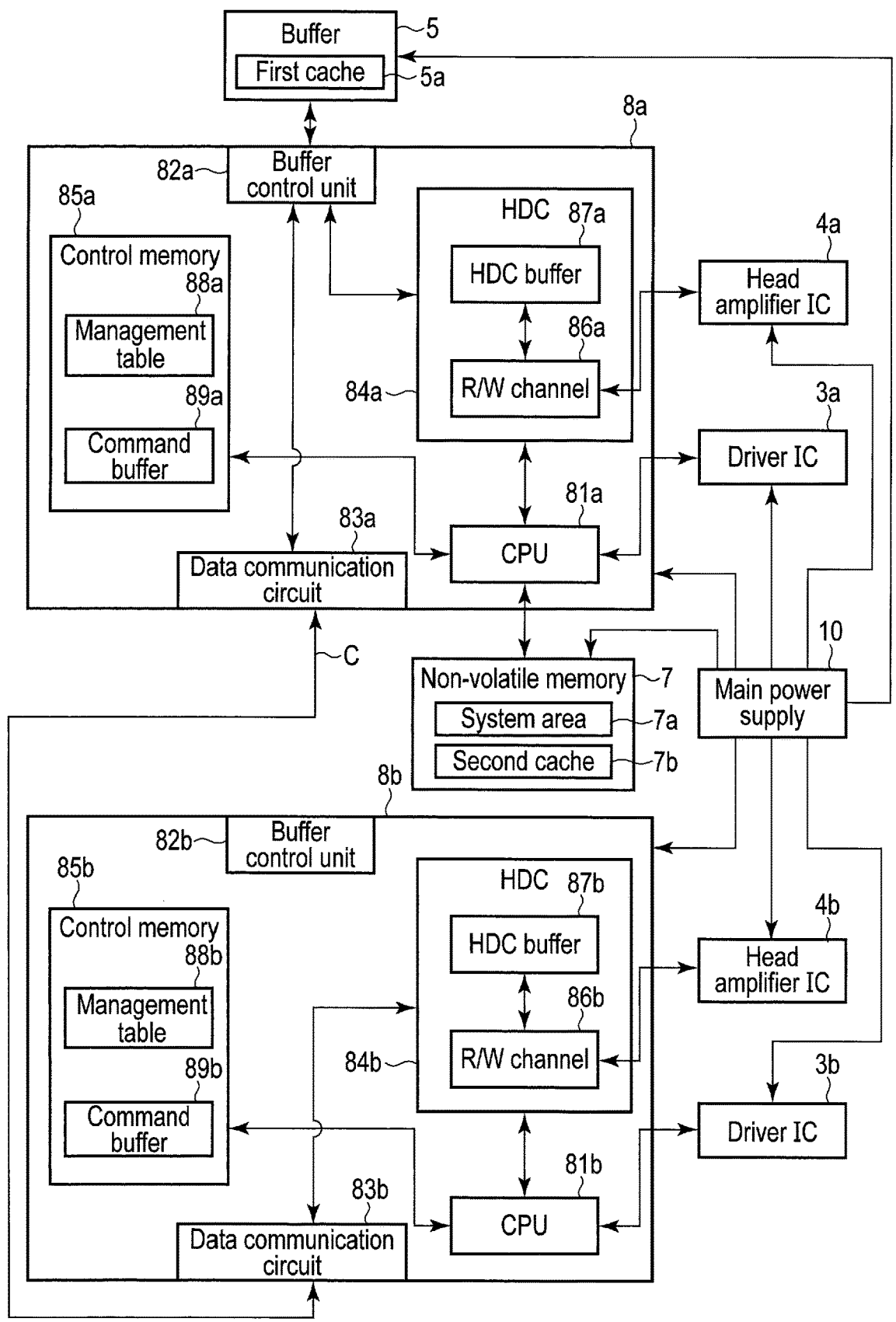
F I G. 2

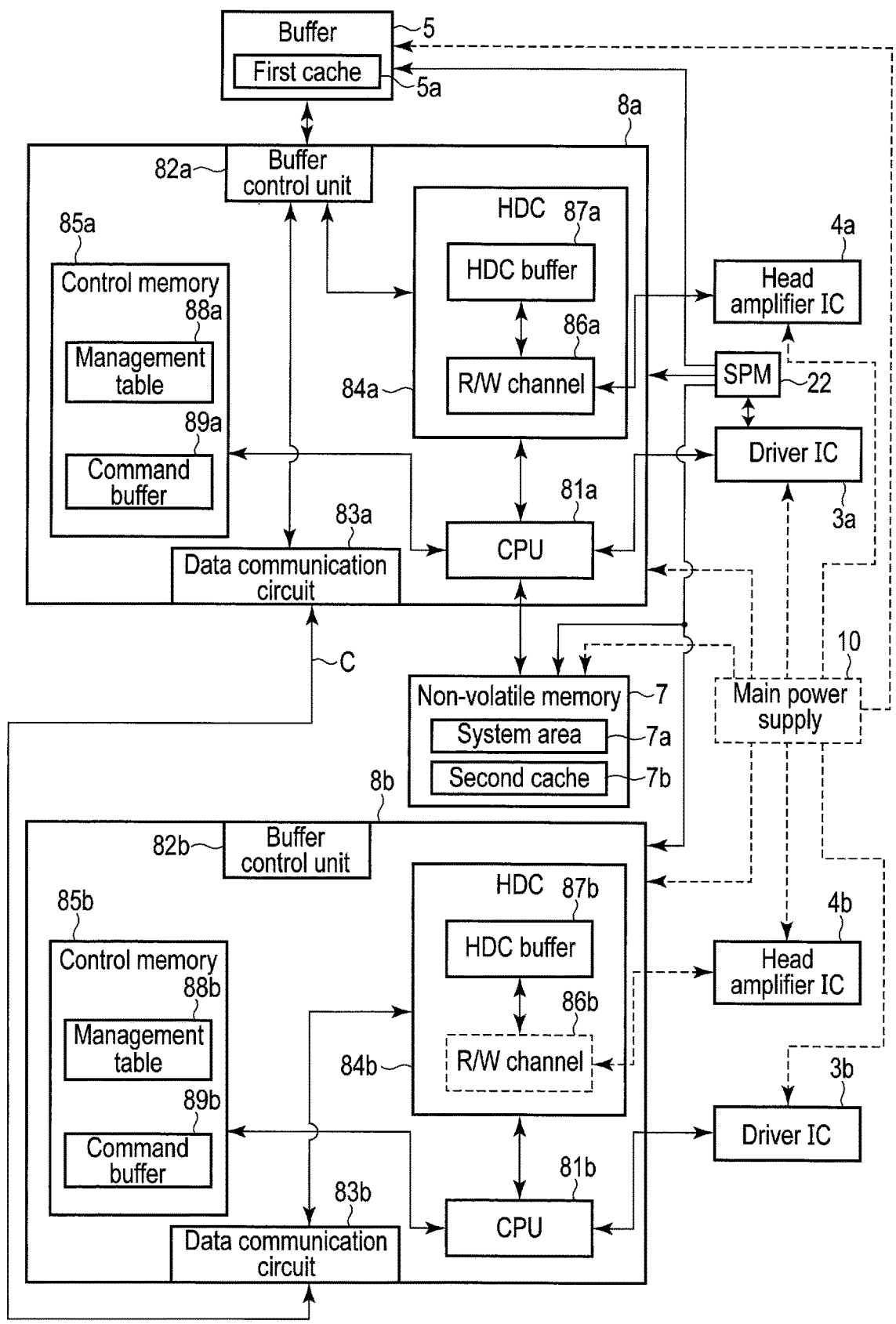
F I G. 8

MAGNETIC DISK DEVICE AND DATA PROTECTION METHOD THEREOF

CROSS-REFERENCE TO RELATED APPLICATIONS

This application is based upon and claims the benefit of priority from Japanese Patent Application No. 2019-155796, filed Aug. 28, 2019, the entire contents of which are incorporated herein by reference.

FIELD

Embodiments described herein relate generally to a magnetic disk device, and a protection method for protecting data in a magnetic disk.

BACKGROUND

In order to increase an efficiency in random writing, a magnetic disk device temporarily writes data to a cache. When power is lost, the power is supplied by, for example, back electromotive force of a spindle motor so as to save cache data in a non-volatile memory. Consequently, data protection is carried out at the time of power loss.

However, in a case where power consumption immediately after power loss is large, power supply by the back electromotive force of the spindle motor is not sufficient depending on a required level, which causes a decrease in voltage. Therefore, there is a possibility that power will be shut down. For example, what is called a multi-actuator magnetic disk device is provided with a plurality of controllers in order to control the respective actuators independently, and accordingly power consumption thereof tends to become larger in comparison with a magnetic disk device having one actuator. Therefore, with respect to the multi-actuator magnetic disk device, there is a possibility that a voltage will decrease rapidly immediately after power loss.

According to embodiments of the present invention, an object of the present invention is to provide a magnetic disk device that is capable of suppressing power consumption immediately after power loss, and is capable of suppressing a sudden decrease in voltage, and to provide a data protection method for protecting data in the magnetic disk device at the time of power loss.

BRIEF DESCRIPTION OF THE DRAWINGS

FIG. 1 is a diagram illustrating an example of a schematic configuration of a magnetic disk device according to an embodiment.

FIG. 2 is a diagram illustrating, as an example, a schematic configuration of system controllers of the magnetic disk device according to the embodiment.

FIG. 8 is a diagram illustrating, as an example, an operation mode used in a case where power supply to a R/W channel of one system controller is interrupted by read/write interruption processing in the magnetic disk device according to the embodiment.

DETAILED DESCRIPTION

Figure 3:
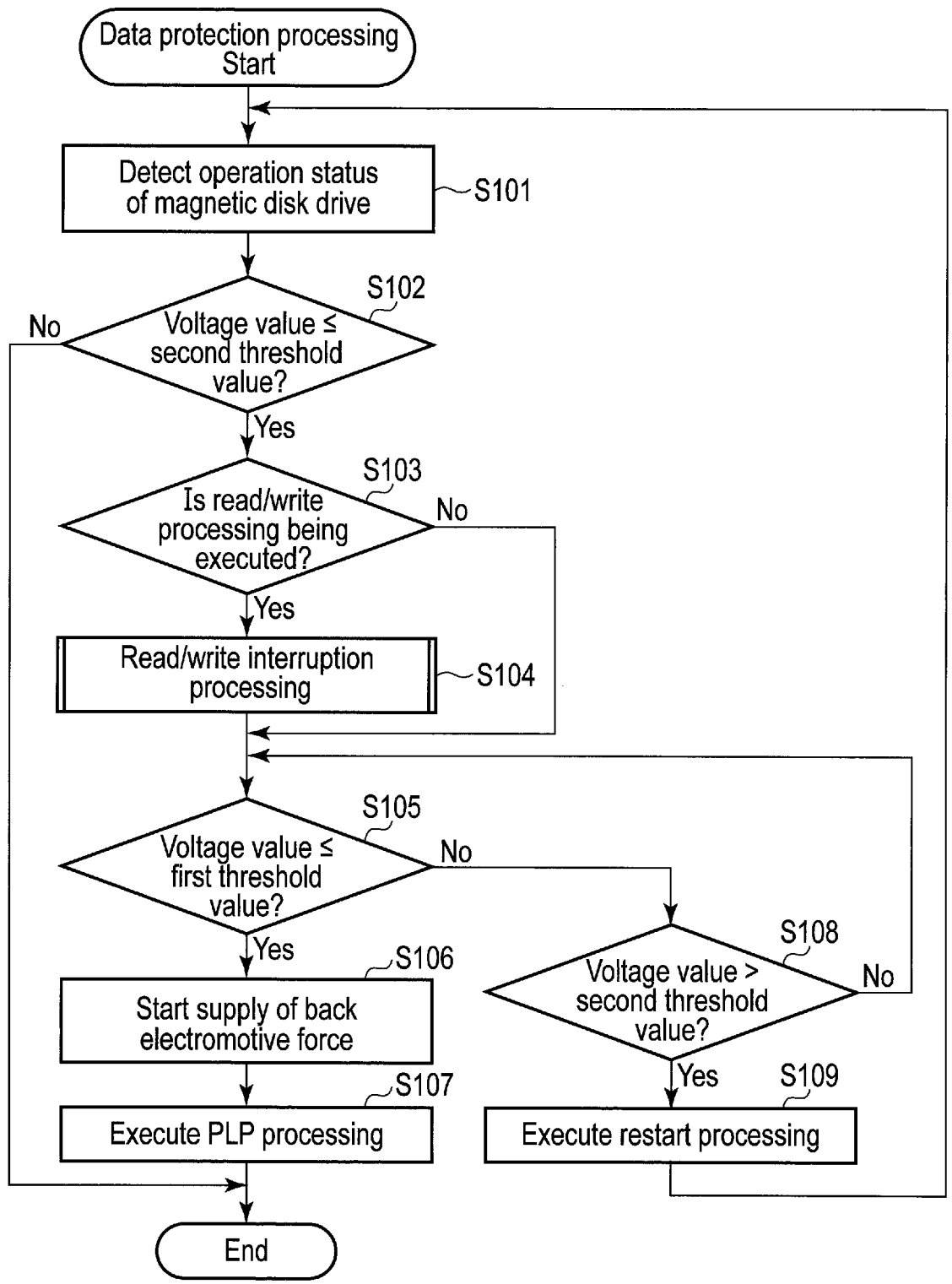
FIG. 3 is a flowchart illustrating an example of data protection processing in the magnetic disk device according to the embodiment.

In general, according to one embodiment, a magnetic disk device is provided with: a magnetic disk; a motor operable to rotate the magnetic disk; a plurality of actuators that execute processing of reading/writing data from/to the magnetic disk; a memory operable to save the data read from or written to the magnetic disk; a controller operable to control the actuators respectively; a monitoring unit operable to monitor a supply voltage supplied to the actuators. The monitoring unit is operable to monitor the supply voltage by a first threshold value at which power supply by back electromotive force of the motor is started, and a second threshold value that is larger than the first threshold value. In a case where the supply voltage is lower than or equal to the second threshold value and is higher than the first threshold value, the controller interrupts execution of the processing in at least one of the actuators according to a predetermined condition based on execution status of the processing in the actuators.

The magnetic disk device according to the embodiment will be described below with reference to FIGS. 1 to 9.

FIG. 1 is a diagram illustrating an example of a schematic configuration of a magnetic disk device 1 according to the embodiment FIG. 1 illustrates the dual actuator type magnetic disk device 1 provided with a plurality of (two as an example) actuators.

The magnetic disk device 1 is provided with a head disk assembly (hereinafter referred to as "HDA") 2, driver ICs 3a, 3b, head amplifier integrated circuits (hereinafter referred to as "head amplifier IC") 4a, 4b, a buffer 5, a volatile memory 6, a non-volatile memory (memory) 7, a system controller (first controller) 8a, and a system controller (second controller) 8b. In addition, the magnetic disk device 1 is communicably connected to a host 9.

The HDA 2 includes a magnetic disk (hereinafter merely referred to as "disk") 21, a spindle motor (hereinafter referred to as "SPM") 22, arms 23a, 23b, and voice coil motors (hereinafter referred to as "VCM") 24a, 24b.

The disk 21 is a magnetic recording medium in which, for example, one surface thereof is provided with a recording surface on which data is magnetically recorded. A recording area 21a that can be used by a user, and a system area 21b to which information required for system management is written, are allocated in a recording area of the disk 21. The disk 21 is rotated by being driven by the SPM 22. The SPM 22 is driven by electric power that is supplied from a power supply (hereinafter referred to as "main power supply") 10 of the magnetic disk device 1 through the driver IC 3a. It should be noted that the number of disks 21 may be two or more. In addition, the disk 21 may have recording surfaces on both sides, and arms (heads) may be arranged corresponding to the respective recording surfaces.

The arm 23a and the VON 24a constitute an actuator (hereinafter referred to as "first actuator"). The arm 23a is equipped with a head 25a. The VCM 24a is driven by electric power supplied from the main power supply 10 through the driver IC 3a, and controls movement of the arm 23a so as to position the head 25a at a target position on the disk 21. Similarly, the arm 23b and the VCM 24b constitute an actuator (hereinafter referred to as "second actuator"). The arm 23b is equipped with a head 25b. The VCM 24b is driven by electric power supplied from the main power supply 10 through the driver IC 3b, and controls movement of the arm 23b so as to position the head 25b at a target position on the disk 21.

The heads 25a, 25b are provided with respective read heads RHa, RHb and respective write heads WHa, WHb, each head being mounted to a slider that is a main body. The read heads RHa, RHb each read data recorded in a data track on the disk 21. The write heads WHa, WHb each write data to the disk 21. The heads 25a, 25b each write data to the disk 21 in units of blocks each including at least one sector, and each read data from the disk 21 in units of blocks. The sector is the minimum unit of data that is read from the disk 21 or is written to the disk 21.

The driver IC 3a controls driving of the SPM 22 and the VCM 24a according to control of the system controller 8a (specifically, the undermentioned CPU 81a). In addition, the driver IC 3b controls driving of the VCM 24b according to control of the system controller 8b (specifically, the undermentioned CPU 81b).

The driver IC 3a is provided with a backup power supply unit 31. As described later, in the embodiment, the system controller 8a corresponds to a master (main) SoC (System-on-a-Chip) of the magnetic disk device 1, and the system controller 8b corresponds to a slave (sub) SoC. Providing the master (main) SoC with the backup power supply unit 31 suffices. However, not only the master SoC but also the slave (sub) SoC may be provided with the backup power supply unit 31.

In a case where the main power supply 10 of the magnetic disk device 1 has been lost (shut down), the backup power supply unit 31 generates electric power as a substitute for the main power supply 10. In other words, in a case where the main power supply 10 has been lost, the backup power supply unit 31 generates electric power for executing data protection processing of the magnetic disk device 1. The data protection processing includes power loss protection (PLP: Power Loss Protection) processing by which even in a case where the main power supply 10 has been lost, write data is guaranteed. PLP processing is processing of saving, in the non-volatile memory 7, data that has not yet been written to the disk 21 when the main power supply 10 has been lost. The generated electric power is supplied to the system controllers 8a, 8b, the buffer 5 and the non-volatile memory 7. The backup power supply unit 31 uses back electromotive force of the SPM 22 to generate the electric power.

The driver IC 3a is provided with a monitoring unit 32 that monitors supply status of a voltage supplied from the main power supply 10. The voltage (supply voltage) supplied from the main power supply 10 is a voltage of supply power used by the driver ICs 3a, 3b to drive the actuators (the arms 23a, 23b and the VCMs 24a, 24b).

The monitoring unit 32 monitors a voltage by comparison with a predetermined threshold value. In the embodiment, the monitoring unit 32 determines a PLP processing start condition and a pre-processing start condition. The PLP processing start condition is a determination condition used to determine whether or not to start PLP processing. The pre-processing start condition is a determination condition used to determine whether or not to start predetermined processing (pre-processing) before starting the PLP processing. The pre-processing is processing that is executed before power supply by the back electromotive force of the SPM 22 is started, the pre-processing being executed to suppress power consumption immediately after power loss, and to suppress a sudden decrease in voltage. Specifically, as pre-processing, data read/write operation is interrupted in the system controller 8a or 8b (the first actuator or the second actuator). Hereinafter, the pre-processing is referred to as "read/write interruption processing", and the pre-processing start condition is referred to as "interruption processing start condition". The read/write interruption processing and the interruption processing start condition will be described below.

In order to determine these conditions, the monitoring unit 32 applies two threshold values. A first threshold value is a threshold value used to determine a PLP processing start condition, and is prescribed as a value at which the power supply by the back electromotive force of the SPM 22 is started. In other words, the first threshold value is a trigger voltage value that causes the PLP processing to be executed. The second threshold value is a threshold value used to determine an interruption processing start condition, and is prescribed as a value at which read/write interruption processing is started before the PLP processing is started. In other words, the second threshold value is a trigger voltage value that causes the read/write interruption processing to be executed.

Monitoring the voltage by comparison with these two threshold values enables to execute read/write interruption processing while the voltage is lower than or equal to the second threshold value and is higher than the first threshold value. Interruption of data read/write operation by the read/write interruption processing enables to suppress power consumption immediately after power loss, and to suppress a sudden decrease in voltage. Therefore, the PLP processing can be reliably executed at the time of power loss.

Each of head amplifiers IC4a, 4b is provided with a read amplifier and a write driver. The read amplifier amplifies a read signal read from the disk 21, and outputs the signal to the system controllers 8a, 8b (specifically, the undermentioned read/write (R/W) channels 86a, 86b). The write driver outputs, to the heads 25a, 25b, a write current corresponding to write data output from the R/W channels 86a, 86b.

The buffer 5 is a semiconductor memory that temporarily records data and the like transmitted/received between the magnetic disk device 1 and the host 9. The buffer 5 is, for example, a Dynamic Random Access Memory (DRAM), a Static Random Access Memory (SRAM), a Synchronous Dynamic Random Access Memory (SDRAM), a Ferroelectric Random Access Memory (FeRAM), or a Magneto resistive Random Access Memory (MRAM). A part of a storage area of the buffer 5 is used as a volatile cache (hereinafter referred to as "first cache") 5a. The first cache 5a is used to temporarily store write data that has been delivered from the undermentioned HDC buffers 87a, 87b of the undermentioned HDC 84a, 84b.

The volatile memory 6 is a semiconductor memory in which when power supply is interrupted, saved data is lost. The volatile memory 6 stores data required for processing in each unit of the magnetic disk device 1. The volatile memory 6 is, for example, a DRAM or an SDRAM.

The non-volatile memory 7 is a semiconductor memory in which even when power supply is interrupted, saved data is recorded. The non-volatile memory 7 is, for example, a NOR type or NAND type flash ROM (Flash Read Only Memory (FROM)). A part of a storage area of the non-volatile memory 7 is used as a system area 7a. An initial program loader (IPL) is stored in the part of the system area 7a beforehand. For example, when the main power supply 10 is turned on, the undermentioned CPUs 81a, 81b execute the IPL, and consequently at least a part of a control program stored in the disk 21 is loaded into the undermentioned control memories 85a, 85b.

Another part of the storage area of the non-volatile memory 7 is used as a non-volatile cache (hereinafter referred to as "second cache") 7b. The second cache 7b is used to save data that remains in the first cache 5a when the main power supply 10 is lost, and that is not written to the disk 21.

The system controllers 8a, 8b are realized by using, for example, a large scale integrated circuit (LSI) that is called SoC, the large scale integrated circuit being produced by integrating a plurality of elements into a single chip. The system controller 8a is a controller that controls the first actuator (the arm 23a and the VCM 24a). The system controller 8b is a controller that controls the second actuator (the arm 23b and the VCM 24b).

FIG. 2 is a drawing illustrating an example of a schematic configuration of the system controllers 8a, 8b. The system controller 8a and the system controller 8b have configurations identical to each other. The system controller 8a corresponds to the master (main) SoC of the dual actuator type magnetic disk device 1. The system controller 8b corresponds to the slave (sub) SoC of the dual actuator type magnetic disk device 1.

As shown in FIG. 2, these system controllers 8a, 8b include the CPU 81a, 81b, buffer control units 82a, 82b, data communication circuits 83a, 83b, the hard disk controllers (hereinafter referred to as "HDC") 84a, 84b, and the control memories 85a, 85b respectively.

The system controller 8a is connected to the driver IC 3a, the head amplifier IC 4a, the buffer 5, the volatile memory 6, the non-volatile memory 7, the system controller 8b, and the host 9. Meanwhile, the system controller 8b is connected to the driver IC 3b, the head amplifier IC 4b, and the system controller 8a. The system controller 8a and the system controller 8b are connected through a communication path C. The communication path C is a communication path that is capable of high-speed data transmission.

The CPU 81a and the CPU 81b are main controllers that control each part of the magnetic disk device 1. The CPUs 81a, 81b control the number of rotations of the SPM 22 through the driver ICs 3a, 3b respectively, and control the VCMs 24a, 24b so as to execute servo control for positioning the heads 25a, 25b respectively. When data is read, the CPUs 81a, 81b control read operation of data from the disk 21, and control read data processing. In addition, when data is written, the CPUs 81a, 81b control write operation of data to the disk 21, and select a saving destination of write data transmitted from the host 9. The CPUs 81a, 81b are connected to the driver ICs 3a, 3b, the HDCs 84a, 84b (specifically, the undermentioned R/W channels 86a, 86b), and the control memories 85a, 85b.

When the main power supply 10 is turned on, the CPUs 81a, 81b execute the IPL from the system area 7a of the non-volatile memory 7, and load the control program stored in the disk 21 into the control memories 85a, 85b respectively. As the result, the CPUs 81a, 81b execute processing of causing the system controllers 8a, 8b to operate in a predetermined operation mode respectively. As an example, the CPU 81a causes the system controller 8a to function as the master (main) SoC, and the CPU 81b causes the system controller 8b to function as the slave (sub) SoC.

The buffer control units 82a, 82b control data delivery between the buffer 5 and the system controllers 8a, 8b respectively. In the embodiment, since the system controller 8b functions as the slave (sub) SoC, the function of the buffer control unit 82b is disabled.

The data communication circuits 83a, 83b mutually connect the system controller 8a and the system controller 8b through the communication path C, and control transmission and reception of data therebetween.

The HDCs 84a, 84b include the read/write (R/W) channels 86a, 86b, and the HDC buffers 87a, 87b respectively, and control data transmission between the host 9 and the R/W channels 86a, 86b according to an instruction from the CPUs 81a, 81b respectively. When data is written, the HDCs 84a, 84b control data transmission between the host 9 and the R/W channels 86a, 86b through the HDC buffers 87a, 87b respectively.

The R/W channels 86a, 86b execute signal processing of read data and write data according to an instruction from the CPUs 81a, 81b. The R/W channels 86a, 86b each have a circuit or function of measuring signal quality of read data. For example, the R/W channels 86a, 86b each have a function of executing error correcting (or error correction) processing (Error Checking and Correcting (ECC)) corresponding to read data read from the disk 21. The R/W channels 86a, 86b are connected to the head amplifier ICs 4a, 4b, and the CPUs 81a, 81b respectively. Each of the HDC buffers 87a, 87b is an area in which write data designated by a write command from the host 9 is delivered from the host 9.

Each of the control memories 85a, 85b is, for example, a volatile memory such as a DRAM. A part of the control program is loaded into a storage area of the control memories 85a, 85b. In addition, management tables 88a, 88b are stored in storage areas of the control memories 85a, 85b respectively. The management tables 88a, 88b include first cache directory information and second cache directory information. The first cache directory information is information used to manage a location of data in the first cache 5a in units of fixed-sized blocks. The second cache directory information is information used to manage a location of data in the second cache 7b in units of fixed-sized blocks. Moreover, storage areas of the control memories 85a, 85b are partially used as command buffers 89a, 89b respectively. The command buffers 89a, 89b each store a queue of read commands and write commands received from the host 9.

When data is read/written from/to the disk 21, the system controllers 8a, 8b operate as follows. In this case, the system controller 8a that serves as the master (main) controls communication with the host 9. It should be noted that the undermentioned first data is data that is written to or read from the disk 21 by using the head 25a, and the undermentioned second data is data that is written to or read from the disk 21 by using the head 25b.

In a case where a read command is received from the host 9, based on an instruction of the CPU 81a, the system controller 8a divides read data into the first data and the second data excluding the first data, and notifies the CPU 81b of information related to the second data through the communication path C. The CPU 81a stores the first data in the buffer 5 through the head amplifier IC 4a, the HDC 84a, and the buffer control unit 82a. The CPU 81b stores the second data in the buffer 5 through the head amplifier IC 4b, the HDC 84b, the data communication circuit 83b, the communication path C, the data communication circuit 83a, and the buffer control unit 82a. Further, the CPU 81a performs the control in such a manner that the first data and the second data stored in the buffer 5 is transmitted to the host 9.

In addition, when a write command (write data) is received from the host 9, the system controller 8a stores write data in the buffer 5 (the first cache 5a) via the buffer control unit 82a. The CPU 81a divides the write data into the first data and the second data excluding the first data, and notifies the CPU 81b of information related to the second data through the communication path C. The CPU 81a writes the first data to the disk 21 through the buffer control unit 82a, the HDC 84a, and the head amplifier IC 4a. Meanwhile, the CPU 81b writes the second data to the disk 21 through the buffer control unit 82a, the data communication circuit 83a, the communication path C, the data communication circuit 83b, the HDC 84b, and the head amplifier IC 4b.

It should be noted that with respect to conditions of the separation into the first data and the second data, for example, data may be separated in units of tracks, heads, or disks, in which data is read or written, or data may be separated into data to be processed as foreground processing and data to processed as background processing.

As described above, according to the embodiment, the supply voltage supplied from the main power supply 10 is monitored, and when the voltage decreases, read/write interruption processing is executed before PLP processing. Consequently, even in a case where the power has been lost, appropriate data protection can be carried out. Processing (data protection processing) executed for achieving such data protection will be described according to a flowchart. FIG. 3 is a flowchart illustrating an example of data protection processing.

As shown in FIG. 3, when data protection processing is performed, first of all, an operation status of the magnetic disk device 1 is detected (S101). Specifically, the system controllers 8a, 8b detect an execution status of data read/write processing by the first actuator and the second actuator, and detect a supply status of a voltage supplied from the main power supply 10. The execution status of the data read/write processing is detected by the CPUs 81a, 81b according to, for example, whether or not signal processing of read/write data has been performed in the R/W channels 86a, 86b. The supply status of the voltage supplied from the main power supply 10 is detected by the monitoring unit 32 of the driver IC 3a as a voltage value of the electric power supplied from the main power supply 10. The detection is repeated while the data protection processing is performed, to be short, while the power is supplied from the main power supply 10 to the magnetic disk device 1, and a detection value is always updated.

Next, when an instruction is received from the CPU 81a that serves as the master (main), the monitoring unit 32 determines an interruption processing start condition (S102). When the determination is made, the monitoring unit 32 compares the detected voltage value with the second threshold value. When the detected voltage value is lower than or equal to the second threshold value, the monitoring unit 32 determines that the interruption processing start condition is fulfilled. Meanwhile, when the detected voltage value exceeds the second threshold value, the monitoring unit 32 determines that the interruption processing start condition is not fulfilled. The monitoring unit 32 gives any of determination results to the CPU 81a. The CPU 81a gives the determination result, which has been given from the monitoring unit 32, to the CPU 81b that serves as the slave (sub).

In a case where it is determined that the interruption processing start condition is not fulfilled, the CPUs 81a, 81b end the data protection processing.

Meanwhile, in a case where it is determined that the interruption processing start condition is fulfilled, the CPUs 81a, 81b determine whether or not the data read/write processing is being executed (S103). When the determination is made, the CPUs 81a, 81b determine, for example, whether or not signal processing of read/write data has been executed in the R/W channels 86a, 86b.

In a case where data read/write processing has been performed, the CPUs 81a, 81b execute processing (read/write interruption processing) of interrupting the data read/write processing (S104). Details of the read/write interruption processing will be described later.

When the read/write interruption processing is executed, on receipt of an instruction from the CPU 81a, the monitoring unit 32 determines a PLP processing start condition (S105). In addition, even in a case where the data read/write processing is not performed in the S103, the read/write interruption processing is not being executed, and a PLP processing start condition is determined. When the determination is made, the monitoring unit 32 compares the detected voltage value with the first threshold value. When the detected voltage value is lower than or equal to the first threshold value, the monitoring unit 32 determines that the PLP processing start condition is fulfilled. A state in which the PLP processing start condition is fulfilled corresponds to a state in which the main power supply 10 has been lost. Meanwhile, when the detected voltage value exceeds the first threshold value, the monitoring unit 32 determines that the PLP processing start condition is not fulfilled. The monitoring unit 32 gives any of determination results to the CPU 81a. The CPU 81a gives, to the CPU 81b, the determination result that has been given from the monitoring unit 32.

In a case where it is determined that the PLP processing start condition is fulfilled, the backup power supply unit 31 causes the SPM 22 to generate back electromotive force, and to start power supply by the back electromotive force (S106). In this case, since the main power supply 10 is lost, the backup power supply unit 31 causes the SPM 22 to generate back electromotive force in preparation for starting of PLP processing, and to generate electric power as substitute for the main power supply 10.

When power supply by the back electromotive force of the SPM 22 is started, the CPUs 81a, 81b execute PLP processing (S107). When the PLP processing is executed, the CPUs 81a, 81b save, in the second cache 7b, data that remains in the first cache 5a without being written to the disk 21 when the main power supply 10 is lost. Consequently, data that is not written to the disk 21 is saved in the non-volatile memory 7.

In the S105, in a case where it is determined that the PLP processing start condition is not fulfilled, on receipt of an instruction from the CPU 81a, the monitoring unit 32 continuously determines a restart condition (S108). The restart condition is a determination condition used to determine whether or not to restart the data read/write processing that has been interrupted by the read/write interruption processing. When the determination is made, the monitoring unit 32 compares the detected voltage value with the second threshold value. If the detected voltage value is higher than the second threshold value, the monitoring unit 32 determines that the restart condition is fulfilled. In this case, it can be determined that the main power supply 10 that has been lost is recovered, and power supply has been restarted. Meanwhile, when the detected voltage value is lower than or equal to the second threshold value, the monitoring unit 32 determines that the restart condition is not fulfilled. In this case, it can be determined that the main power supply 10 that has been lost is not recovered, and therefore power supply is in a shutdown state. The monitoring unit 32 gives any of determination results to the CPU 81*a*. The CPU 81*a* gives, to the CPU 81*b*, the determination result that has been given from the monitoring unit 32.

In a case where it is determined that the restart condition is fulfilled, the CPU 81*a* executes restart processing (S109). The restart processing is processing of restarting interrupted data read/write processing. After the data read/write processing is restarted, the CPUs 81*a*, 81*b* perform processing in the S101 and subsequent steps again, and execute the read/write interruption processing, the PLP processing and the restart processing as appropriate.

In a case where it is determined that the restart condition is not fulfilled, the monitoring unit 32 determines the PLP processing start condition again (S105). As the result, according to whether or not the PLP processing start condition is fulfilled, processing of S106 to S109 is executed as appropriate. Subsequently, when the PLP processing is executed, the CPU 81*a* ends the data protection processing.

Next, contents of read/write interruption processing will be described. The read/write interruption processing is processing that is executed before PLP processing is started, and is processing that causes data read/write processing to be interrupted in at least one of the plurality of actuators. As the result, when the main power supply 10 is lost, power consumption is suppressed immediately after power supply by the back electromotive force of the SPM 22 is started, and therefore a sudden decrease in voltage is suppressed.

In the read/write interruption processing, at least one data read/write processing is caused to be interrupted according to situations of data read/write processings in the system controllers 8*a*, 8*b*. In the embodiment, for example, four situations are assumed as such situations, and read/write interruption processings in four modes corresponding to the respective situations (hereinafter referred to as "first to fourth interruption processings") are executed as appropriate. It should be noted that the number of modes related to read/write interruption processing is not limited to four, and thus other modes can be arbitrarily applied.

The first interruption processing, the second interruption processing, the third interruption processing and the fourth interruption processing will be described below.

Figure 4:
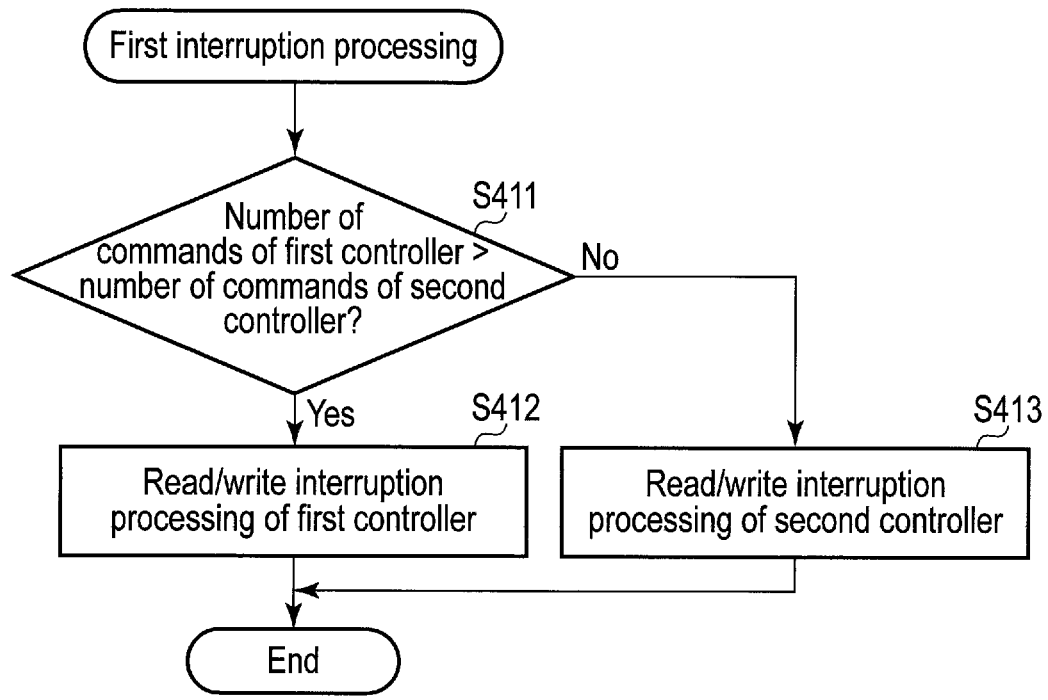
FIG. 4 is a flowchart illustrating an example of first interruption processing in the magnetic disk device according to the embodiment.

FIG. 4 is a flowchart illustrating an example of the first interruption processing. In the first interruption processing, a first interruption condition is determined, and the first interruption processing is executed according to whether or not the first interruption condition is fulfilled. The first interruption condition is a condition related to determining the number of times read/write processings of the system controllers 8*a*, 8*b* are executed, specifically, related to determining which one of the first actuator and the second actuator less frequently executes read/write processing. The number of times (frequency) of read/write processing is prescribed by, for example, the number of read commands and the number of write commands, the read commands and the write commands being stored in the command buffers 89*a*, 89*b*. When the first interruption condition is determined, the CPU 81*a* compares the numbers of the commands stored in the command buffers 89*a*, 89*b* (S411). For example, the CPU 81*a* obtains the number of the commands stored in the command buffer 89*a*, and obtains the number of the commands stored in the command buffer 89*b* from the CPU 81*b* to compare, both. A comparison result is given from the CPU 81*a* to the CPU 81*b*.

As the result of the determination of the first interruption condition, in a case where the number of times read/write processing of the system controller 8*a* is executed is smaller than the number of times read/write processing of the system controller 8*b* is executed, the CPU 81*a* causes the read/write processing in the system controller 8*a* to be interrupted (S412). For example, the CPU 81*a* causes power supply to the R/W channel 86*a* to be interrupted. Consequently, the data read/write processing in the first actuator is interrupted. Meanwhile, in a case where the number of times read/write processing of the system controller 8*b* is executed is smaller than the number of times read/write processing of the system controller 8*a* is executed, on receipt of an instruction from the CPU 81*a*, the CPU 81*b* causes the read/write processing in the system controller 8*b* to be interrupted (S413). For example, the CPU 81*b* causes power supply to the R/W channel 86*b* to be interrupted. Consequently, the data read/write processing in the second actuator is interrupted. In other words, the CPUs 81*a*, 81*b* cause data read/write processing to be interrupted in either one of the system controllers 8*a*, 8*b*, the either one less frequently executing read/write processing.

According to the first interruption processing, while an influence exerted on processing capability (performance) of the magnetic disk device 1 is suppressed, power consumption that accompanies read/write processing, in other words, a sudden decrease in voltage that occurs when the main power supply 10 is lost, can be suppressed.

Figure 5:
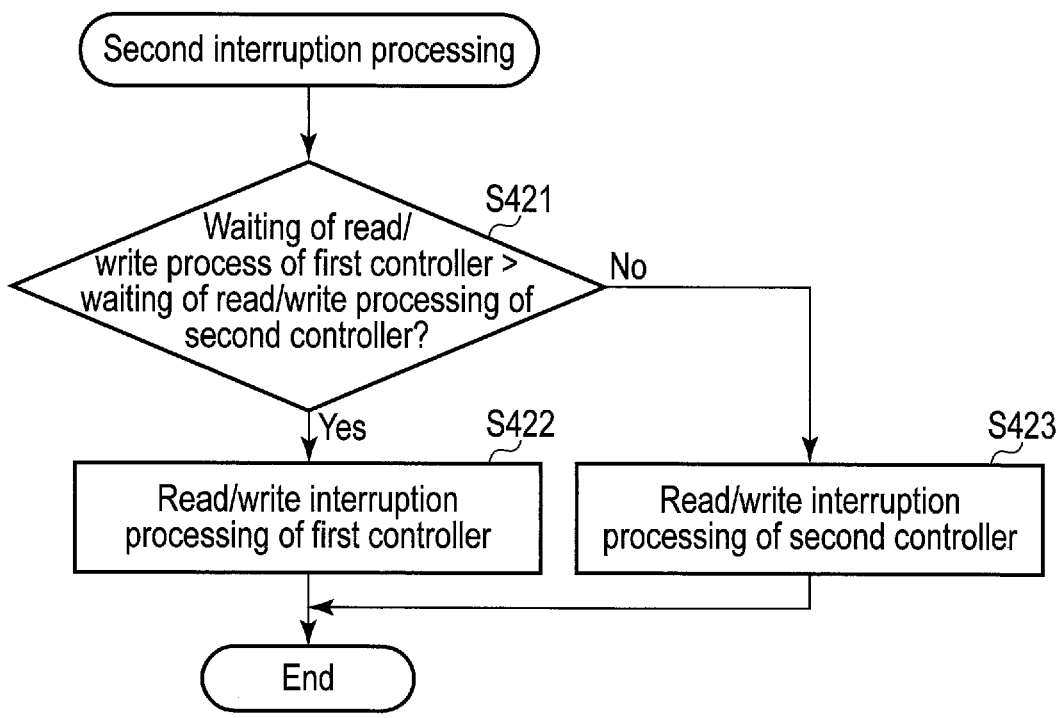
FIG. 5 is a flowchart illustrating an example of second interruption processing in the magnetic disk device according to the embodiment.

FIG. 5 is a flowchart illustrating an example of the second interruption processing. In the second interruption processing, a second interruption condition is determined, and the second interruption processing is executed according to whether or not the second interruption condition is fulfilled. The second interruption condition is a condition related to determining whether or not read/write processing enters a waiting state, in other words, a read/write command is kept in a waiting state, in any of the system controllers 8*a*, 8*b*, and related to determining a length of waiting. A waiting situation of read/write processing is prescribed by, for example, presence/absence (length) of a queue of read commands commands, the read commands and the write commands being stored in the command buffers 89*a*, 89*b*. When the second interruption condition is determined, the CPU 81*a* compares lengths of queues of commands stored in the command buffers 89*a*, 89*b* (S421). For example, the CPU 81*a* obtains a length of a queue of commands stored in the command buffer 89*a*, and obtains a length of a queue of commands stored in the command buffer 89*b* from the CPU 81*b* to compare both. It can be determined that with the increase in length of queue, waiting of read/write processing becomes longer. A comparison result is given from the CPU 81*a* to the CPU 81*b*.

As the result of the determination of the second interruption condition, in a case where waiting of read/write processing of the system controller 8*a* is long, the CPU 81*a* causes the read/write processing in the system controller 8*a* to be interrupted (S422). Meanwhile, in a case where waiting of read/write processing of the system controller 8*b* is long, on receipt of an instruction from the CPU 81*a*, the CPU 81*b* causes the read/write processing in the system controller 8*b* to be interrupted (S423). In other words, the CPUs 81*a*, 81*b* cause data read/write processing to be interrupted in either one of the system controllers 8a, 8b, waiting of read/write processing being longer in the either one. In a case where read/write processing is caused to be interrupted, as with the first interruption processing, the CPUs 81a, 81b have only to cause power supply to the R/W channels 86a, 86b to be interrupted.

It should be noted that irrespective of the length of waiting, the CPUs 81a, 81b may cause data read/write processing to be interrupted in any of the system controllers 8a, 8b when read/write processing is kept in a waiting state therein. In this case, data read/write processing in at least one of the first actuator and the second actuator is interrupted.

According to the second interruption processing, read/write processing in system controllers 8a, 8b in which read/write processing can be quickly interrupted because the read/write processing is kept in a waiting state can be interrupted. Therefore, power consumption that accompanies read/write processing, in other words, a sudden decrease in voltage that occurs when the main power supply 10 is lost, can be more quickly suppressed.

Figure 6:
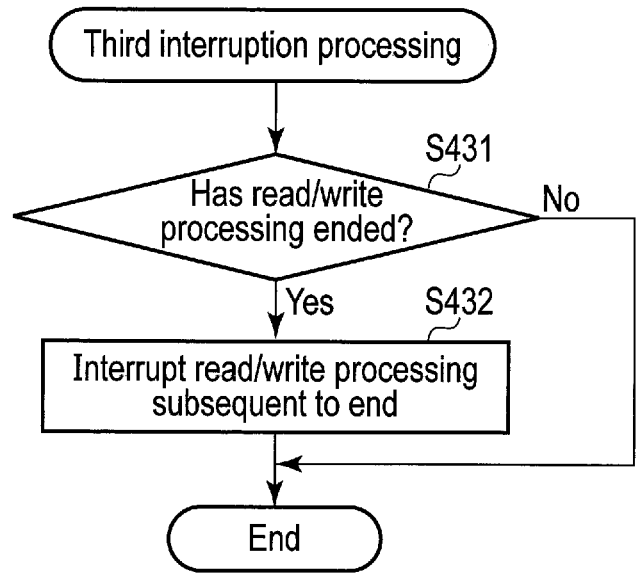
FIG. 6 is a flowchart illustrating an example of third interruption processing in the magnetic disk device according to the embodiment.

FIG. 6 is a flowchart illustrating an example of the third interruption processing. In the third interruption processing, a third interruption condition is determined, and the third interruption processing is executed according to whether or not the third interruption condition is fulfilled. The third interruption condition is a condition related to determining whether or not read/write processing has ended, in other words, whether or not execution of a read/write command has ended, in any of the system controllers 8a, 8b. An end situation of read/write processing is prescribed by, for example, whether or not data (the first data and the second data) is stored in the buffer 5 (the first cache 5a). If the first data or the second data is not stored in the buffer 5 (the first cache 5a), the CPU 81a determines that the read/write processing has ended (S431). A determination result is given from the CPU 81a to the CPU 81b.

As the result of the determination of the third interruption condition, the CPUs 81a, 81b cause subsequent read/write processing to be interrupted in the system controllers 8a, 8b in which read/write processing has ended (S432). In a case where read/write processing is caused to be interrupted, as with the first and second interruption processings, the CPUs 81a, 81b have only to cause power supply to the R/W channels 86a, 86b to be interrupted. Consequently, data read/write processing in at least one of the first actuator and the second actuator is interrupted.

According to the third interruption processing, it is possible to interrupt read/write processing in system controllers 8a, 8b in which read/write processing can be quickly interrupted because the read/write processing has ended. Therefore, power consumption that accompanies read/write processing, in other words, a sudden decrease in voltage that occurs when the main power supply 10 is lost, can be more quickly suppressed.

Figure 7:
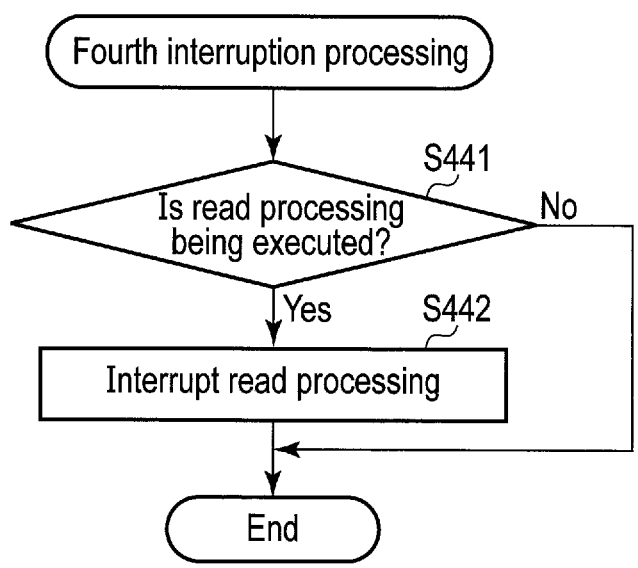
FIG. 7 is a flowchart illustrating an example of fourth interruption processing in the magnetic disk device according to the embodiment.

FIG. 7 is a flowchart illustrating an example of the fourth interruption processing. In the fourth interruption processing, a fourth interruption condition is determined, and the fourth interruption processing is executed according to whether or not the fourth interruption condition is fulfilled. The fourth interruption condition is a condition related to determining whether or not read processing (read command) is being executed in any of the system controllers 8a, 8b. Whether or not read processing is being executed is determined by, for example, whether or not read data is stored in the buffer 5, or whether or not a read command is stored in the command buffers 89a, 89b. If read data is stored in the buffer 5, or if a read command is stored in the command buffers 89a, 89b, the CPU 81a determines that read processing is being executed (S441). A determination result is given from the CPU 81a to the CPU 81b.

As the result of the determination of the fourth interruption condition, the CPUs 81a, 81b cause data read processing to be interrupted in the system controllers 8a, 8b in which read processing is being executed (S442). In a case where read processing is caused to be interrupted, as with the first to third interruption processings, the CPUs 81a, 81b have only to cause power supply to the R/W channels 86a, 86b to be interrupted. Consequently, data read/write processing in at least one of the first actuator and the second actuator is interrupted.

According to the fourth interruption processing, read processing in the system controllers 8a, 8b in which not write processing but read processing is being executed can be interrupted. Therefore, after the main power supply 10 that has been lost is recovered, when read/write processing is restarted, write data to be restored can be minimized, which enables to simplify data restoration work.

For example, the first to fourth interruption processings are selectively executed. As an example, the first to fourth interruption conditions are successively determined, and predetermined interruption processing has only to be executed according to whether or not the condition is fulfilled. In other words, when a predetermined interruption condition is fulfilled, interruption processing corresponding to the interruption condition is executed. In addition, any of the first to fourth interruption conditions selected beforehand is determined, and predetermined interruption processing may be executed according to whether or not the determined interruption condition is fulfilled.

FIG. 8 shows, as an example, an operation mode applied in a case where power supply to the R/W channel 86b of the system controller 8b is interrupted by read/write interruption processing. In this case, the main power supply 10 is lost. Therefore, power is supplied to the CPUs 81a, 81b by the back electromotive force of the SPM 22, and the CPUs 81a, 81b execute PLP processing.

It should be noted that irrespective of whether or not the first to fourth interruption conditions are fulfilled, the CPUs 81a, 81b may interrupt data read/write processing in the system controllers 8a, 8b. In this case, irrespective of whether or not the first to fourth interruption conditions are fulfilled, the CPU 81a causes power supply to the R/W channel 86a to be interrupted, and the CPU 81b causes power supply to the R/W channel 86b to be interrupted. This enables to enhance effects of suppressing power consumption that accompanies read/write processing, in other words, effects of suppressing a sudden decrease in voltage when the main power supply 10 has been lost.

In this manner, according to the magnetic disk device 1 in the embodiment, a voltage supplied from the main power supply 10 can be monitored in two stages by using the first threshold value that prescribes a trigger voltage at which PLP processing is started, and the second threshold value that prescribes a trigger voltage at which read/write interruption processing is started. Therefore, when a voltage supplied from the main power supply 10 has decreased, read/write interruption processing can be executed before PLP processing is started. Consequently, in a case where the main power supply 10 has been lost, data read/write processing can be interrupted before power supply by the back electromotive force of the SPM 22 is started. As the result, power consumption immediately after power loss can be suppressed, and thus a sudden decrease in voltage can be suppressed. For example, even in the case of the dual actuator type magnetic disk device 1 in which two actuators independently control data read/write processing, with the result that power consumption easily increases, a sudden decrease in voltage immediately after power loss can be effectively suppressed. Therefore, even in the dual actuator type magnetic disk device 1 such as that described above, PLP processing can be reliably executed at the time of power loss, and data can be properly protected.

Figure 9:
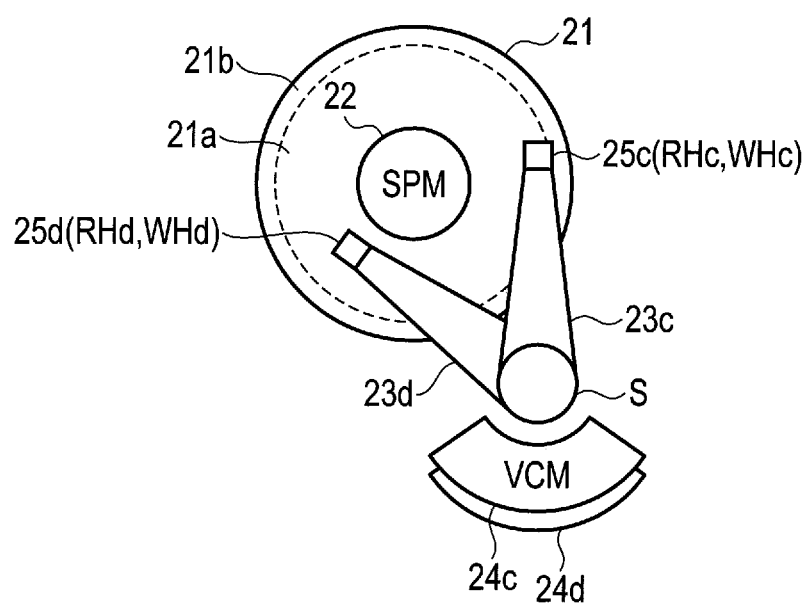
FIG. 9 is a drawing illustrating an example of a schematic configuration of a dual actuator type magnetic disk device having another configuration different from that of the above-described embodiment.

According to the above-described embodiment, the dual actuator has a configuration in which two actuators use respective different shafts for driving. However, the configuration of the dual actuator is not limited to this. For example, the dual actuator may be configured to control driving of two actuators by using one shaft. Specifically, as shown in FIG. 9, the dual actuator may be configured in such a manner that an actuator provided with an arm 23c and a VCM 24c, and an actuator provided with an arm 23d and a VCM 24d are mounted to one shaft S, and movements of heads 25c (RHc, WHc), 25d (RHd, WHd) to target positions on the disk 21 are controlled by these actuators respectively.

In addition, according to the above-described embodiment, the magnetic disk device is configured to be a dual actuator type magnetic disk device provided with two actuators. However, the number of actuators is not limited to this. For example, the magnetic disk device may be provided with three or more actuators.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a motor operable to rotate the magnetic disk;
a plurality of actuators each executing processing of reading/writing data from/to the magnetic disk;
a memory operable to save the data read from or written to the magnetic disk;
a controller operable to control each of the actuators; and
a monitoring unit operable to monitor a supply voltage supplied to the actuators, wherein
the monitoring unit is operable to monitor the supply voltage by a first threshold value at which power supply by back electromotive force of the motor is started, and a second threshold value that is larger than the first threshold value,
in a case where the supply voltage is lower than or equal to the second threshold value and is higher than the first threshold value, the controller interrupts execution of the processing in at least one of the actuators according to a predetermined condition based on execution status of the processing in the actuators, and
in a case where the actuators are executing the processings respectively, the controller determines, as the predetermined condition, which one of the actuators frequently executes the processing, and causes execution of the processing to be interrupted in the actuator that least frequently executes the processing.

2. A magnetic disk device comprising:
a magnetic disk;
a motor operable to rotate the magnetic disk;
a plurality of actuators each executing processing of reading/writing data from/to the magnetic disk;
a memory operable to save the data read from or written to the magnetic disk;
a controller operable to control each of the actuators; and
a monitoring unit operable to monitor a supply voltage supplied to the actuators, wherein
the monitoring unit is operable to monitor the supply voltage by a first threshold value at which power supply by back electromotive force of the motor is started, and a second threshold value that is larger than the first threshold value,
in a case where the supply voltage is lower than or equal to the second threshold value and is higher than the first threshold value, the controller interrupts execution of the processing in at least one of the actuators according to a predetermined condition based on execution status of the processing in the actuators, and
in a case where the actuators are executing the processings respectively, the controller determines, as the predetermined condition, whether or not the processing has entered a waiting state in the actuators, and causes execution of the processing to be interrupted in the actuator in which the processing has entered a waiting state.

3. The magnetic disk device according to claim 1, wherein after the processing is interrupted, in a case where the supply voltage has decreased to a value lower than or equal to the first threshold value, the controller starts power supply by back electromotive force of the motor, and causes the data that has not been read from or written to the magnetic disk at the time of starting of the power supply to be saved in the memory.

4. The magnetic disk device according to claim 2, wherein after the processing is interrupted, in a case where the supply voltage has decreased to a value lower than or equal to the first threshold value, the controller starts power supply by back electromotive force of the motor, and causes the data that has not been read from or written to the magnetic disk at the time of starting of the power supply to be saved in the memory.

5. A magnetic disk device comprising:
a magnetic disk;
a motor operable to rotate the magnetic disk;
a plurality of actuators each executing processing of reading/writing data from/to the magnetic disk;
a memory operable to save the data read from or written to the magnetic disk;
a controller operable to control each of the actuators; and
a monitoring unit operable to monitor a supply voltage supplied to the actuators, wherein
the monitoring unit is operable to monitor the supply voltage by a first threshold value at which power supply by back electromotive force of the motor is started, and a second threshold value that is larger than the first threshold value, and
in a case where the supply voltage is lower than or equal to the second threshold value and is higher than the first threshold value and the actuators are executing the processings respectively, the controller determines whether or not the processing has ended in the actuators, and causes execution of the subsequent processing to be interrupted in the actuator in which the processing has ended, and after the processing is interrupted, in a case where the supply voltage has decreased to a value lower than or equal to the first threshold value, the controller starts power supply by back electromotive force of the motor, and causes the data that has not been read from or written to the magnetic disk at the time of starting of the power supply to be saved in the memory.

6. A magnetic disk device comprising:
a magnetic disk;
a motor operable to rotate the magnetic disk;
a plurality of actuators each executing processing of reading/writing data from/to the magnetic disk;
a memory operable to save the data read from or written to the magnetic disk;
a controller operable to control each of the actuators; and
a monitoring unit operable to monitor a supply voltage supplied to the actuators, wherein
the monitoring unit is operable to monitor the supply voltage by a first threshold value at which power supply by back electromotive force of the motor is started, and a second threshold value that is larger than the first threshold value, and
in a case where the supply voltage is lower than or equal to the second threshold value and is higher than the first threshold value and the actuators are executing the processings respectively, the controller determines whether or not any of the actuators is executing read processing of reading the data, and causes execution of the processing to be interrupted in the actuator that is executing read processing of reading the data and, after the processing is interrupted, in a case where the supply voltage has decreased to a value lower than or equal to the first threshold value, the controller starts power supply by back electromotive force of the motor, and causes the data that has not been read from or written to the magnetic disk at the time of starting of the power supply to be saved in the memory.

7. A magnetic disk device comprising:
a magnetic disk;
a motor operable to rotate the magnetic disk;
a plurality of actuators each executing processing of reading/writing data from/to the magnetic disk;
a memory operable to save the data read from or written to the magnetic disk;
a controller operable to control each of the actuators; and
a monitoring unit operable to monitor a supply voltage supplied to the actuators, wherein
the monitoring unit is operable to monitor the supply voltage by a first threshold value at which power supply by back electromotive force of the motor is started, and a second threshold value that is larger than the first threshold value, and
in a case where the supply voltage is lower than or equal to the second threshold value and is higher than the first threshold value and the actuators are executing the processings respectively, the controller causes execution of the processing to be interrupted in all of the actuators and, after the processing is interrupted, in a case where the supply voltage has decreased to a value lower than or equal to the first threshold value, the controller starts power supply by back electromotive force of the motor, and causes the data that has not been read from or written to the magnetic disk at the time of starting of the power supply to be saved in the memory.

8. A magnetic disk device comprising:
a magnetic disk;
a motor operable to rotate the magnetic disk;
a plurality of actuators each executing processing of reading/writing data from/to the magnetic disk;
a memory operable to save the data read from or written to the magnetic disk;
a controller operable to control each of the actuators; and
a monitoring unit operable to monitor a supply voltage supplied to the actuators, wherein
the monitoring unit is operable to monitor the supply voltage by a first threshold value at which power supply by back electromotive force of the motor is started, and a second threshold value that is larger than the first threshold value, and
in a case where the supply voltage is lower than or equal to the second threshold value and is higher than the first threshold value, the controller interrupts execution of the processing in at least one of the actuators according to a predetermined condition based on execution status of the processing in the actuators, and after the processing is interrupted, in a case where the supply voltage has decreased to a value lower than or equal to the first threshold value, the controller starts power supply by back electromotive force of the motor, and causes the data that has not been read from or written to the magnetic disk at the time of starting of the power supply to be saved in the memory, and in a case where the supply voltage has increased to a value higher than the second threshold value, the controller causes the interrupted processing to be restarted.

9. The magnetic disk device according to claim 3, wherein after the processing is interrupted, in a case where the supply voltage has increased to a value higher than the second threshold value, the controller causes the interrupted processing to be restarted.

10. The magnetic disk device according to claim 4, wherein after the processing is interrupted, in a case where the supply voltage has increased to a value higher than the second threshold value, the controller causes the interrupted processing to be restarted.

11. The magnetic disk device according to claim 5, wherein after the processing is interrupted, in a case where the supply voltage has increased to a value higher than the second threshold value, the controller causes the interrupted processing to be restarted.

12. The magnetic disk device according to claim 6, wherein after the processing is interrupted, in a case where the supply voltage has increased to a value higher than the second threshold value, the controller causes the interrupted processing to be restarted.

13. The magnetic disk device according to claim 7, wherein after the processing is interrupted, in a case where the supply voltage has increased to a value higher than the second threshold value, the controller causes the interrupted processing to be restarted.

* * * * *